(12) United States Patent
Ishino

(10) Patent No.: US 10,571,013 B2
(45) Date of Patent: Feb. 25, 2020

(54) PLANETARY GEAR MECHANISM

(71) Applicant: HONDA MOTOR CO., LTD., Tokyo (JP)

(72) Inventor: Koutaro Ishino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/940,378

(22) Filed: Mar. 29, 2018

(65) Prior Publication Data

US 2018/0283532 A1    Oct. 4, 2018

(30) Foreign Application Priority Data

Mar. 29, 2017 (JP) ................................ 2017-065034

(51) Int. Cl.
*F16H 1/28* (2006.01)
*F16H 57/08* (2006.01)
*F16H 57/04* (2010.01)

(52) U.S. Cl.
CPC ............. *F16H 57/082* (2013.01); *F16H 1/28* (2013.01); *F16H 57/0486* (2013.01); *F16H 2057/085* (2013.01)

(58) Field of Classification Search
CPC ...... F16H 1/28; F16H 57/082; F16H 57/0486; F16H 2057/085
USPC ........................................................ 475/331
See application file for complete search history.

(56) References Cited

U.S. PATENT DOCUMENTS

| | | | | |
|---|---|---|---|---|
| 4,480,492 A | * | 11/1984 | Fujioka | ............... F16H 57/0427 184/6.12 |
| 4,776,237 A | * | 10/1988 | Premiski | ................. F16C 21/00 384/420 |
| 5,302,160 A | * | 4/1994 | Fujioka | ................. F16H 57/082 475/348 |
| 5,368,528 A | * | 11/1994 | Farrell | .................... F16C 19/48 384/424 |

(Continued)

FOREIGN PATENT DOCUMENTS

| | | |
|---|---|---|
| JP | 57-105423 U1 | 6/1982 |
| JP | 57-105424 U1 | 6/1982 |

(Continued)

OTHER PUBLICATIONS

Notification of Reasons for Refusal dated Nov. 27, 2018, issued in counterpart Japanese Application No. 2017-065034, with English machine translation. (8 pages).

(Continued)

*Primary Examiner* — Leslie A Nicholson, III
(74) *Attorney, Agent, or Firm* — Westerman, Hattori, Daniels & Adrian, LLP

(57) ABSTRACT

A planetary gear mechanism a sun gear, pinion gears meshing with the sun gear, a planetary carrier having pinion shafts pivotally supporting the pinion gears, a ring gear meshing with the pinion gears, and washers provided between the planetary carrier and the pinion gears. The washers include first washers that are disposed on the side of the planetary carrier and that have projections projecting radially outwardly from outer circumferential sides and second washers that are disposed between the first washers and the pinion gears. The projections come into contact with the planetary carrier and thereby prevent rotation of the first washers.

5 Claims, 7 Drawing Sheets

(56) References Cited

U.S. PATENT DOCUMENTS

| | | | | | |
|---|---|---|---|---|---|
| 5,593,362 | A | * | 1/1997 | Mizuta | F16H 57/082 475/348 |
| 5,928,100 | A | * | 7/1999 | Ohtake | F16H 57/0482 475/159 |
| 6,106,429 | A | * | 8/2000 | Mortensen | F16H 57/082 475/331 |
| 6,502,994 | B2 | * | 1/2003 | Jackson | F16C 17/04 384/368 |
| 6,702,711 | B2 | * | 3/2004 | Zelikov | F16H 57/082 475/331 |
| 6,817,962 | B2 | * | 11/2004 | Tanikawa | F16H 57/043 475/159 |
| 7,022,039 | B2 | * | 4/2006 | Hasegawa | F16H 57/043 475/159 |
| 7,252,615 | B2 | * | 8/2007 | Kempf | F16H 57/043 475/159 |
| 7,686,727 | B2 | * | 3/2010 | Hammill | F16H 57/0482 184/6.12 |
| 2010/0120576 | A1 | * | 5/2010 | Satou | F16H 57/041 475/348 |

FOREIGN PATENT DOCUMENTS

| | | | |
|---|---|---|---|
| JP | 2005-155856 A | 6/2005 | |
| JP | 2005-214393 A | 8/2005 | |

OTHER PUBLICATIONS

Office Action dated Jun. 12, 2018, issued in counterpart Japanese Application No. 2017-065034. (3 pages).
Office Action dated Jun. 18, 2019, issued in counterpart JP application No. 2017-065034, with English translation. (4 pages).

\* cited by examiner

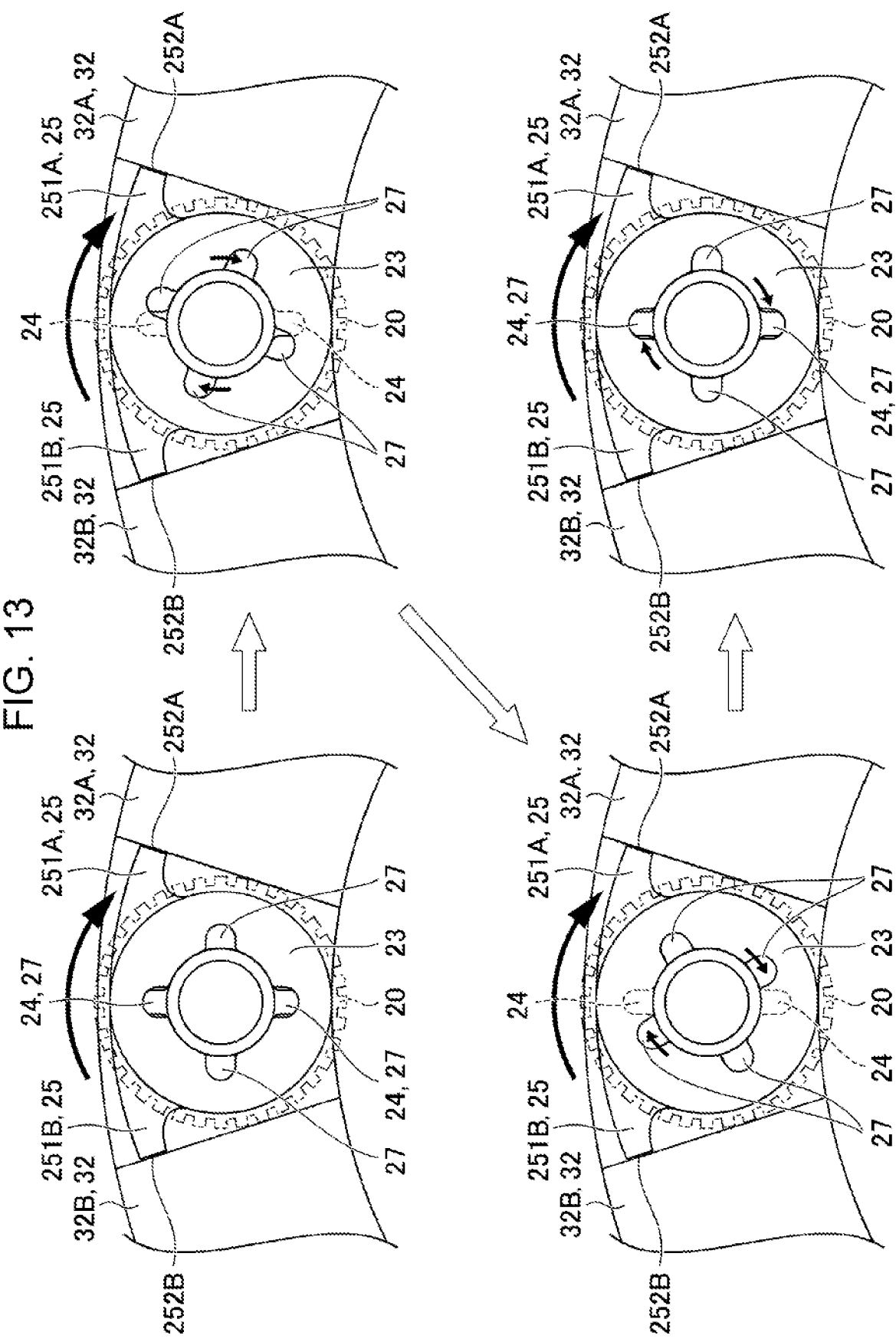

PLANETARY GEAR MECHANISM

CROSS REFERENCES RELATED APPLICATIONS

The present application claims priority wider 35 U.S.C. § 119 to Japanese Patent Application No. 2017-065034, filed Mar. 29, 2017, entitled "Planetary Gear Mechanism." The contents of this application are incorporated herein by reference in their entirety.

BACKGROUND

1. Field

The present disclosure relates to a planetary gear mechanism.

2. Description of the Related Art

There is known a planetary gear mechanism disposed on a power transmission path between wheels of a vehicle and a driving source that drives the wheels. In such a planetary gear mechanism, two disk-shaped washers are provided between a planetary carrier of the planetary gear mechanism and a planetary gear (hereinafter referred to as a pinion gear) pivotally supported by the planetary carrier so as to prevent or reduce wear of the planetary carrier caused by the rotation of the pinion gear (see, for example, Japanese Unexamined Patent Application Publication No. 2005-214393).

Japanese Unexamined Patent Application Publication No. 2005-214393 discloses that one of the two washers on the side of the pinion gear has its surface coated with a film that reduces wear from occurring between the washers and thereby improves the wear resistance of the washers.

However, since the rotation of the pinion gear puts the washers into a state of rotational movement, performing only surface-coating of the washers has been known to be ineffective in reducing wear from occurring between the washers and the planetary carrier due to the rotation of the washers. As a result, the washers disposed between the pinion gear and the planetary carrier may experience a premature wear problem.

SUMMARY

The present application describes a planetary gear mechanism that can prevent or reduce rotation of a washer caused by rotation of a pinion gear and thereby reduce friction.

A first aspect of the present application provides a planetary gear mechanism (for example, a planetary gear mechanism 1 to be described later) which includes a sun gear (for example, a sun gear 10 to be described later), pinion gears (for example, pinion gears 20 to be described later) meshing with the sun gear, a planetary carrier (for example, a planetary carrier 30 to be described later) having pinion shafts (for example, pinion shafts 31 to be described later) pivotally supporting the pinion gears, a ring gear (for example, a ring gear 40 to be described later) meshing with the pinion gears, and washers (for example, washers 21 to be described later) provided between the planetary carrier and the pinion gears, in which the washers include first washers (for example, first washers 23 to be described later) that are disposed on the side of the planetary carrier and that have projections (for example, projections 25 to be described later) projecting radially outwardly from outer circumferential sides and second washers (for example, second washers 26 to be described later) that are disposed between the first washers and the pinion gears, and in which the projections come into contact with the planetary carrier and thereby prevent rotation of the first washers.

The planetary gear mechanism of the first aspect includes the washers having projections projecting radially outwardly. The projections come into contact with part of the planetary carrier. With this arrangement, when the pinion gears are rotated, the washers are prevented from being rotated in conjunction with rotation of the pinion gears. Consequently, preventing the rotation of the washers reduces friction that occurs between the washers and the planetary carrier in conventional planetary gear mechanisms.

A second aspect of the present application provides the planetary gear mechanism of the first aspect in which the washers are preferably provided on the rotation axis at both ends of the pinion gears and are preferably coated with manganese phosphate.

In the second aspect, the manganese phosphate coating provided on surfaces of the second washers reduces friction between the first washers and the second washers, thereby improving the wear resistance.

A third aspect of the present application provides the planetary gear mechanism of the first or second aspect in which the first washers are preferably formed of copper.

In the third aspect, copper used to form the first washers makes it easier to form the projections.

A fourth aspect of the present application provides the planetary gear mechanism of the first to third aspects in which the projections of the first washers preferably come in contact with wall members of the planetary carrier.

In the fourth aspect, causing the projections of the first washers to come into contact with the wall members of the planetary carrier substantially secures the washers to the planetary carrier. With this arrangement, no friction is generated between the washers and the planetary carrier. Consequently, the effect of the first aspect can be clearly provided.

A fifth aspect of the present application provides the planetary gear mechanism of the first to fourth aspects in which the first washers have first recesses (for example, first recesses 24 to be described later) that are provided on inner circumferential sides so as to extend radially outwardly, the first recesses being routes through which oil can be passed, and the second washers have second recesses (for example, second recesses 27 to be described later) that are provided on inner circumferential sides so as to extend radially outwardly, the second recesses being routes through which oil can be passed.

In the fifth aspect, oil as a lubricant is delivered to gaps between the first washers and the second washers and gaps between the second washers and the pinion gears through the recesses provided in the washers, thereby enabling oil films to be maintained between the first washers and the second washers. These oil films ensure the wear resistance. With this arrangement, the recesses provided in the first washers and the second washers reduce friction that is generated between various components in conjunction with the rotation of the pinion gears, thereby improving the wear resistance.

BRIEF DESCRIPTION OF THE DRAWINGS

FIG. 13 is top views explaining the operation and effect of a washer according to the embodiment.

DESCRIPTION OF THE PREFERRED EMBODIMENTS

An embodiment of the present application will be described below in detail with reference to the attached drawings. The present application, however, is not limited to the embodiment to be described below. Various modifications are conceivable within the scope of the present application. In the following description, a direction in which gears are inserted during the process of gear assembly is defined as the upward direction (see FIG. 2) for convenience, while the direction opposite thereto is defined as the downward direction.

Figure 1:
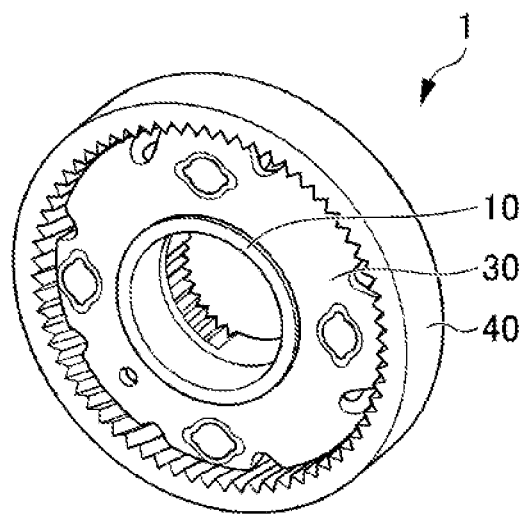
FIG. 1 is a perspective view of a planetary gear mechanism according to an embodiment of the present application.
Figure 2:
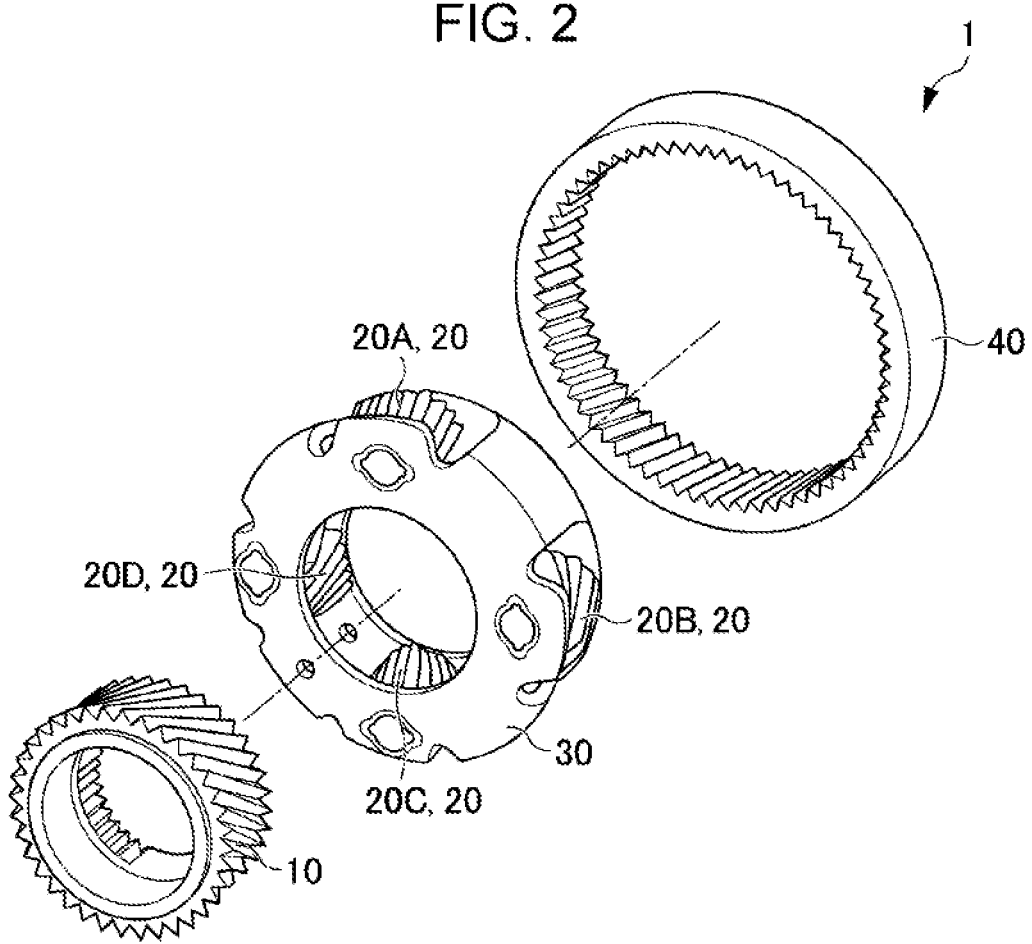
FIG. 2 is an exploded perspective view of the planetary gear mechanism of FIG. 1.
Figure 3:
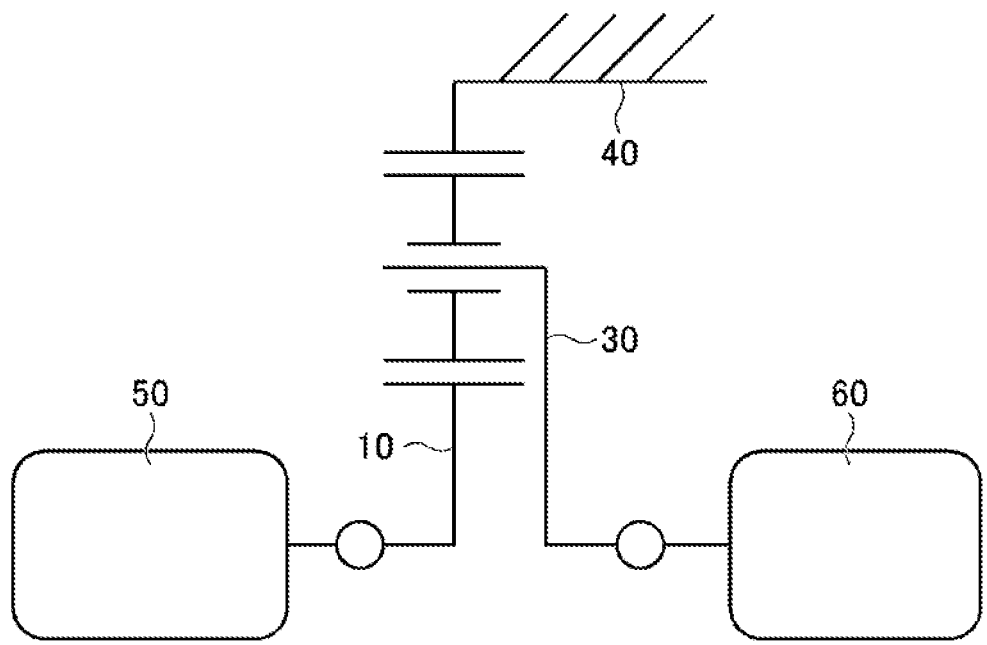
FIG. 3 is a skeleton diagram showing an example of an application of the planetary gear mechanism according to the present application.

FIG. 1 is a perspective view of a planetary gear mechanism according to an embodiment of the present application. FIG. 2 is an exploded perspective view of the planetary gear mechanism 1 of FIG. 1. FIG. 3 is a skeleton diagram showing an example of an application of the planetary gear mechanism 1 according to the present application. The planetary gear mechanism 1 shown in FIG. 1 includes a sun gear 10, pinion gears 20 that mesh with the sun gear 10, a planetary carrier 30 that pivotally supports the pinion gears 20, and a ring gear 40 that meshes with the pinion gears 20.

As shown in FIG. 2, the planetary carrier 30 having the sun gear 10 disposed thereinside is disposed inside the ring gear 40, thereby forming the planetary gear mechanism 1. With this arrangement, the planetary gear mechanism 1 enables the sun gear 10, the planetary carrier 30, and the ring gear 40 to coaxially rotate.

The sun gear 10 is an external gear that is disposed so as to mesh with the pinion gears 20 inside the planetary gear mechanism 1. The sun gear 10 has a cylindrical shaft (not illustrated) formed integrally thereinside that extends in the direction of a rotation axis and that is connected to an internal combustion engine.

The sun gear 10 is rotated in a predetermined direction, for example, when the cylindrical shaft receives a forward driving torque from the internal combustion engine, thereby transmitting the torque thus received to the pinion gears 20.

The pinion gears 20 are external gears that are disposed so as to concurrently mesh with the sun gear 10 and the ring gear 40 inside the planetary gear mechanism 1. In this embodiment, four pinion gears 20A through 20D are pivotally supported by the planetary carrier 30. The pinion gears 20A through 20D have uniform thickness along the rotation axis and have holes formed thereinside through which pinion shafts 31 are inserted.

The ring gear 40 is an internal gear that is disposed so as to mesh with the pinion gears 20 on the outer part of the planetary gear mechanism 1. In addition, the ring gear 40 has a one-way clutch (not illustrated) disposed at the outer circumference thereof. Such a one-way clutch transmits drive power that acts on the ring gear 40 in only a predetermined direction and cuts off drive power in the other direction.

The ring gear 40 is locked or unlocked by the one-way clutch. Specifically, when the sun gear 10 is rotated in a predetermined direction for forward driving, the ring gear 40 needs to be rotationally moved in the opposite direction to receive torque from the sun gear 40. For this purpose, the ring gear 40 can be configured to receive torque from the sun gear 10 by being locked by the one-way clutch. As described above, the vehicle can be changed between acceleration and deceleration states by changing the ring gear 40 between stationary and rotational states.

The planetary gear mechanism 1 according to this embodiment can be applied to continuously variable transmissions, center differentials for four-wheel drive vehicles, and the like. In cases where the planetary gear mechanism according to this embodiment is applied to, for example, a continuously variable transmission in a hybrid vehicle, the sun gear 10 is coupled to an internal combustion engine (hereinafter referred to as an engine) 50, the planetary carrier 30 is coupled to an electric generator 60, and the ring gear 40 is put into a stationary state by the one-way clutch as shown in FIG. 3. With this arrangement, the driving power of the engine 50 can be distributed to wheels (not illustrated) and the electric generator 60.

Figure 4:
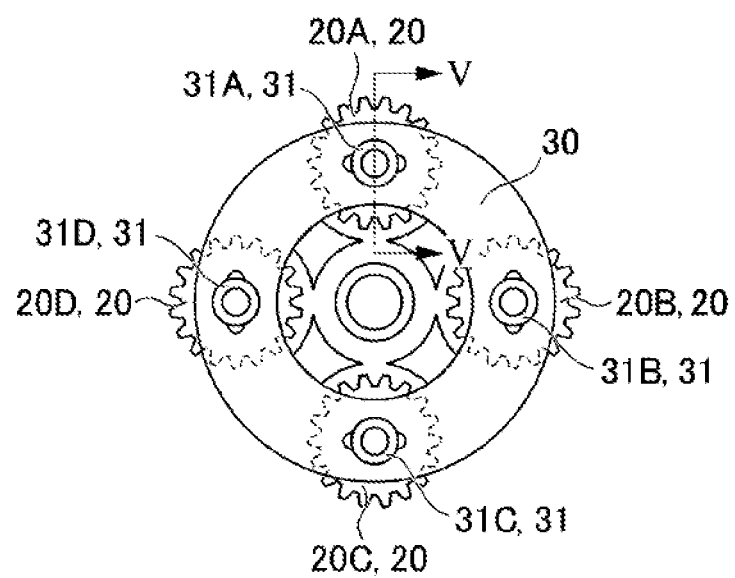
FIG. 4 is a top view of a planetary carrier of FIG. 1.
Figure 5:
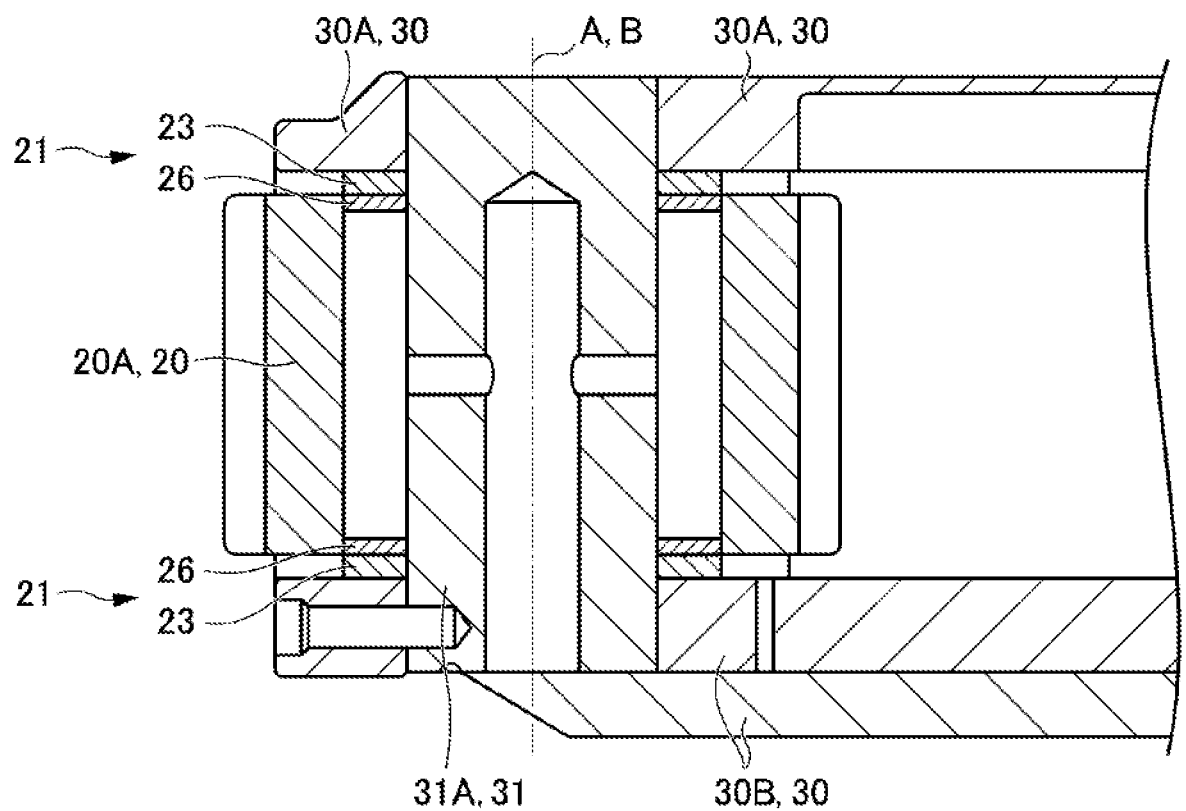
FIG. 5 is a cross-sectional view taken along line V-V of FIG. 4.
Figure 6:
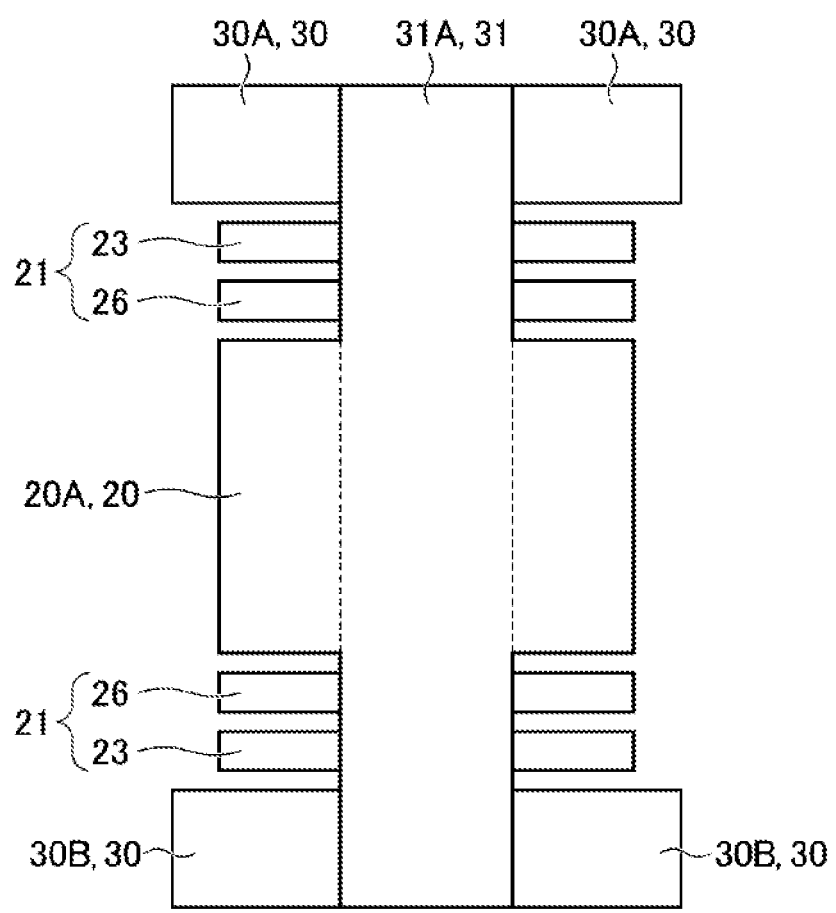
FIG. 6 is a schematic diagram showing a pinion gear of FIG. 5 and its surrounding components.

Next, referring to FIGS. 4 through 12, a structure for supporting the pinion gears 20 and the planetary carrier 30 is described below in detail. FIG. 4 is a top view of the planetary carrier of FIG. 1. FIG. 5 is a cross-sectional view taken along line V-V of FIG. 4. FIG. 6 is a schematic diagram showing a pinion gear of FIG. 5 and its surrounding components. FIGS. 7 through 12 are top views of various components provided in the planetary carrier shown in FIG. 5. Note that the sun gear is disposed inside the planetary carrier 30 in the views, though not illustrated, and that the ring gear is disposed outside the planetary carrier 30, though not illustrated.

The planetary carrier 30 shown in FIG. 4 pivotally supports the four pinion gears 20A through 20D in the middle of the planetary gear mechanism 1. In the planetary carrier 30, the pinion gears 20A through 20D are disposed so as to mesh with the ring gear 40. The planetary carrier 30 has a plurality of pinion shafts 31 (31A through 31D) that pivotally support the pinion gears, wall members 32 (for example, 32A and 32B of FIG. 7) that partition the inside of the planetary carrier 30 so as to surround the pinion shafts, and oil passages (not illustrated) through which oil as a lubricant is distributed to the pinion gears 20 and the like. The pinion shafts 31, the wall members 32, and the oil passages are equally spaced in the planetary carrier 30.

The pinion shafts 31 shown in FIG. 5 are disposed so as to extend from a top surface 30A to a bottom surface 30B of the planetary carrier 30.

The direction B in which the pinion shafts 31 are installed is configured to be parallel to the rotation axis of the sun gear 10 and the ring gear 40. In addition, the direction B in which the pinion shafts 31 are installed coincides with the rotation axis B of the pinion gears 20, as shown in FIG. 5. The pinion shafts 31 are provided at some parts thereof with part of the oil passages through which oil is passed to rotating shafts and blades and an oil supply opening.

Referring to FIG. 4, the pinion shafts 31A through 31D pivotally support the pinion gears 20 and the washers 21, respectively. The pinion gears 20 are rotatable about the pinion shafts 31A through 31D. Note that the number and location of the pinion shafts 31 according to this embodiment can be changed as needed, depending on the number of the pinion gears 20 mounted in the planetary carrier 30.

Figure 7:
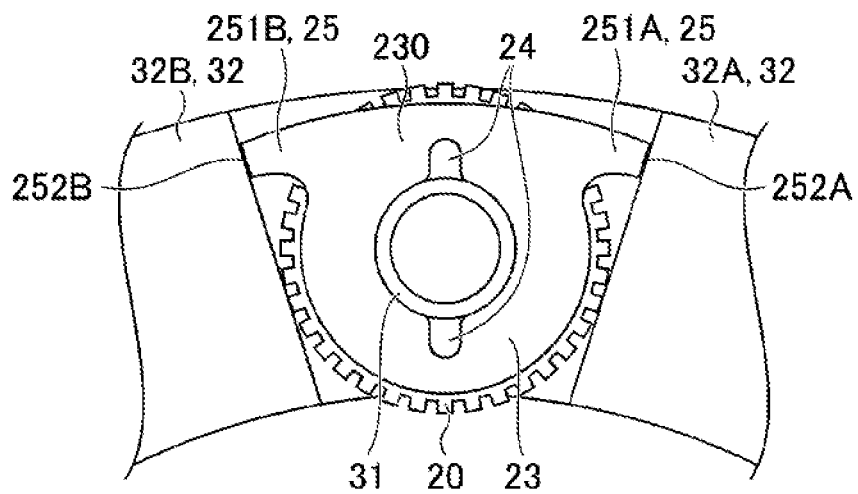
FIG. 7 is a top view of a first washer on the upper side shown in FIG. 5.

The wall members 32 (32A and 32B in the figures) shown in FIG. 7 are provided inside the planetary carrier 30 so as to enable the pinion gears 20, the washers 21, and the pinion shafts 31 to be disposed between the wall members 32A and 32B that are adjacent to each other. In this embodiment, the wall members 32 are provided at a total of four locations. The wall members 32 are formed with the same material as the planetary carrier 30. Note that the number and location of the wall members 32 according to this embodiment can be changed as needed, depending on the number of the pinion gears 20 mounted in the planetary carrier 30.

The oil passages are the routes through which oil is delivered to the pinion gears 20 and the washers 21. In this embodiment, an adequate amount of oil is delivered to create an oil film between the pinion gears 20 and the washers 21 through these passages.

Referring to FIG. 5, the washers 21 are metal washers that reduce friction between the pinion gears 20 and the planetary carrier 30 that are rotated relative to each other when the sun gear 10 is rotated in response to a power input. The washers 21 has recesses 22 and projections 25. The washers 21 are provided on the rotation axis of the pinion gears 20 so as to be located at both ends of the pinion gears 20. The washers 21 include first washers 23 and second washers 26. The recesses 22 of the washers 21 include first recesses 24 (see, for example, FIG. 7) of the first washers 23 to be described later and second recesses 27 (see, for example, FIG. 8) of the second washers 26 to be described later.

One of the first washers 23 is provided on the side of the top surface 30A (see, for example, FIG. 7) of the planetary carrier 30 and one is provided on the side of the bottom surface 30B (see, for example, FIG. 11) of the planetary carrier 30. The first washer 23 is formed of copper substantially in the shape of a disk and has a circular-shaped hole formed on the inner circumferential side thereof through which the pinion shaft 31 is inserted. The first washer 23 shown in FIG. 7 has the two first recesses 24 extending radially outwardly on the inner circumferential side thereof and the projection 25 projecting radially outwardly on the outer circumferential side thereof.

The first washer 23 may include phosphor bronze or other alloy, in addition to copper. The use of copper as the base material of the first washer 23 provides good formability, enabling the first recesses 24 and the projection 25 to be easily formed. In addition, the use of copper in the first washer 23 provides wear reduction due to its low friction coefficient and washer weight reduction, in addition to the good formability described above. Furthermore, the first washer 23 is formed of a material different from that of the second washer 26, providing reduction in burning between the first and second washers and other advantageous effects.

The first recesses 24 are provided on the inner circumferential side of the first washer 23 at two locations so as to extend radially outwardly. The first recesses 24 create gaps between the inner circumferential surface of the first washer 23 and the pinion shaft 31. The gaps created by the first recesses 24 are openings through which the oil delivered through the oil passages of the planetary carrier 30 runs along the wall into other components. Although the first recesses 24 are provided on the inner circumferential side of the first washer 23 at two locations in this embodiment, their number and location can be changed, depending on the specifications.

The projection 25 projects radially outwardly on the outer circumferential side of the first washer 23 and comes into contact with the wall members 32 of the planetary carrier 30. The projection 25 is formed integrally with a main body 230 of the first washer 23. The projection 25 has a first projection arm 251A formed on the rotation axis of the pinion gear 20 on the clockwise side thereof and a second projection arm 251B formed on the counterclockwise side thereof. The projection 25 suppresses the rotation and sliding motion of the first washer 23 while the pinion gear 20 is being rotated.

A first end surface 252A of the first projection arm 251A is in contact with a wall surface of the wall member 32A of the planetary carrier 30. In addition, a second end surface 252B of the second projection arm 251B is in contact with a wall surface of the wall member 32B of the planetary carrier 30. The first end surface 252A and the second end surface 252B are preferably angled so as to be in surface contact with the wall members 32. The projection arms according to the present application may have any shape if contact with the wall members 32 of the planetary carrier 30 is obtained and if the rotation and sliding motion of the first washer 23 can be suppressed. The shape of the projection arms is not limited to the shape of the first projection arm 251A and the second projection arm 251B according to this embodiment.

Figure 8:
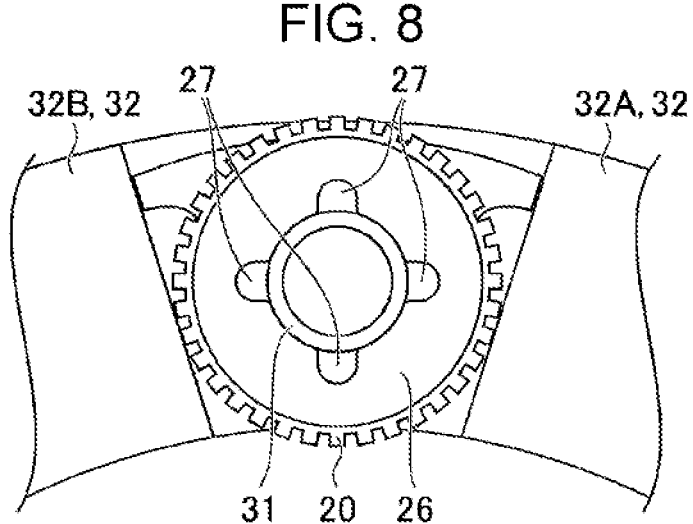
FIG. 8 is a top view of a second washer on the upper side shown in FIG. 5.
Figure 9:
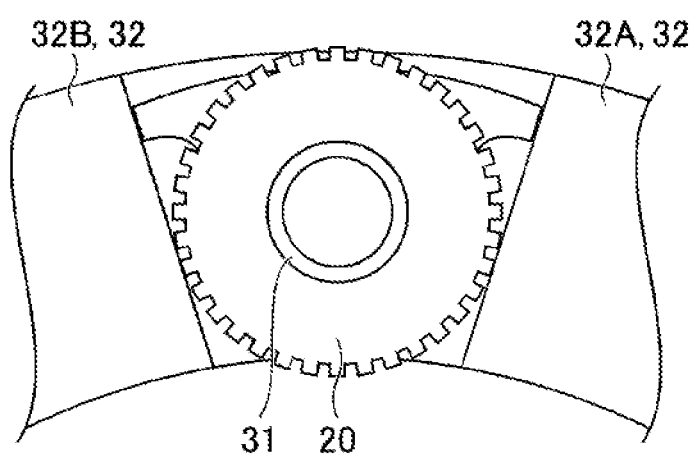
FIG. 9 is a top view of a pinion gear shown in FIG. 5.
Figure 10:
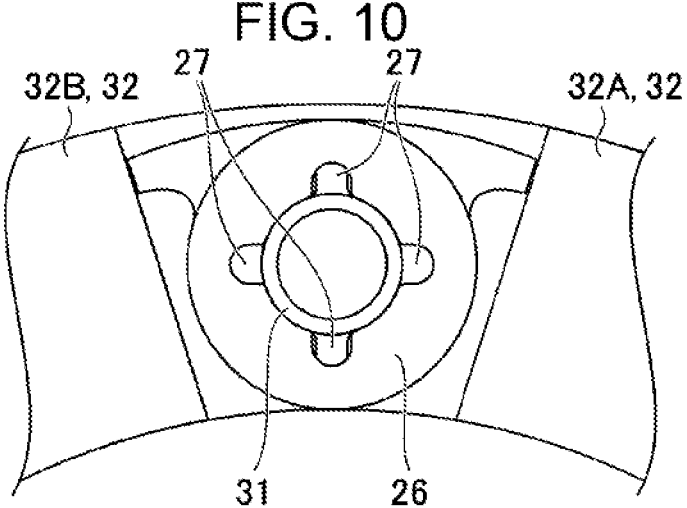
FIG. 10 is a top view of a second washer on the lower side shown in FIG. 5.
Figure 11:
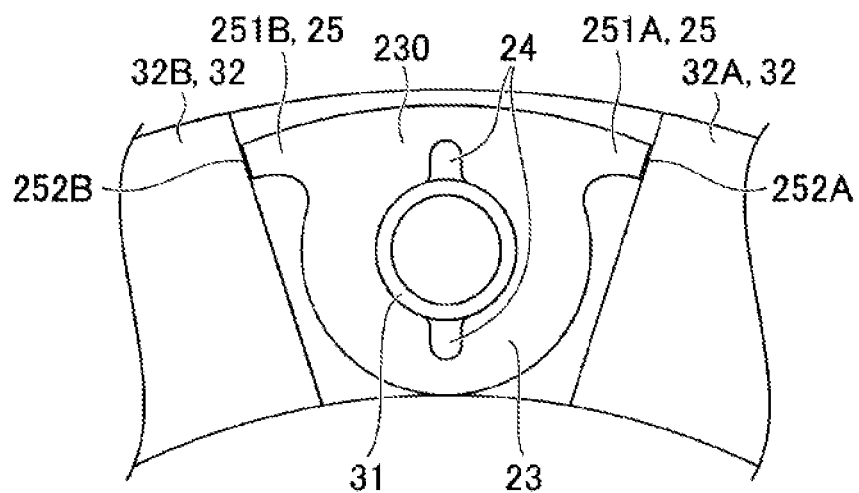
FIG. 11 is a top view of a first washer on the lower side shown in FIG. 5.
Figure 12:
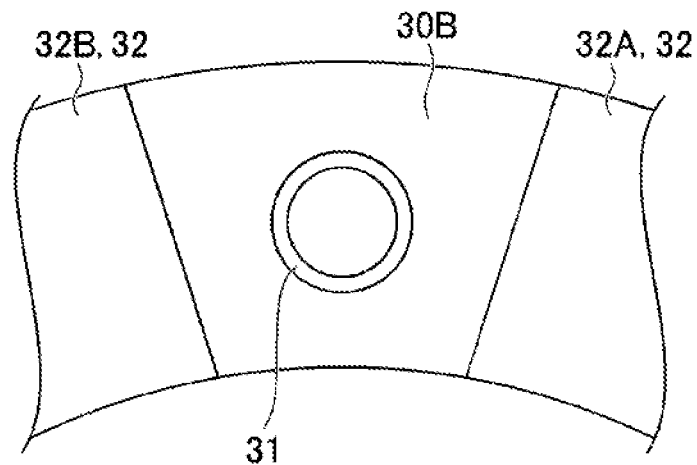
FIG. 12 is a bottom view of a planetary carrier shown in FIG. 5.

The second washer 26 shown in FIG. 8 is provided between the pinion gear 20 and the first washer 23. The second washer 26 is formed of steel in the shape of a disk and has a hole formed on the inner circumferential side thereof through which the pinion shaft 31 is inserted. In addition, the second washer 26 has four of the second recesses 27 extending radially outwardly on the inner circumferential side thereof through which the oil delivered through the oil passages can be distributed to other components. The second washer 26 may include various kinds of alloy, in addition to steel.

The second washer 26 is coated with manganese phosphate, nitride, or resin. In this embodiment, the second washer 26 is coated with manganese phosphate. The second washer 26 coated with manganese phosphate reduces wear caused by the rotation and sliding motion of the first washer 23, thereby improving the wear resistance.

The thickness of the manganese phosphate coating is preferably 3 μm to 7 μm. Manganese phosphate having the above thickness gives the surface of the second washer 26 improved resistance to wear and corrosion. If needed, the coating may be provided only on portions of the second washer 26 that come into contact with the first washer 23.

Like the first recesses 24, the second recesses 27 are provided in the second washer 26 to deliver to other components the oil delivered through the oil passages of the planetary carrier 30. Although four of the second recesses 27 are provided in the second washer 26 in this embodiment, their number and locations can be changed, depending on the specifications.

In this embodiment, the first washer 23, the second washer 26, the pinion gear 20, the second washer 26, and the first washer 23, all of which are pivotally supported by the pinion shaft 31, are arranged in this order on the pinion shaft 31 from the side of the top surface 30A of the planetary carrier 30 (see, for example, FIG. 6).

Oil films are formed in gaps between the first washers 23 and the second washers 26 and in gaps between the second washers 26 and the pinion gear 20. The oil films preferably have a thickness of approximately 10 μm. Oil films formed elsewhere in the planetary gear mechanism reduce friction between various components and thereby suppress premature wear of the components.

Following the description of the planetary gear mechanism 1 according to this embodiment, operation and effect of the washers 21 according to this embodiment will be described below with reference to FIG. 13. FIG. 13 is top views explaining the operation and effect of the washers according to this embodiment. In these top views, the sun gear is disposed inside the planetary carrier 30, though not illustrated. In addition, the ring gear is disposed outside the planetary carrier 30, though not illustrated.

As shown in the view at the upper left-hand corner of FIG. 13, the first end surface 252A of the first projection arm 251A and the second end surface 252B of the second projection arm 251B, both end surfaces being those of the first washer 23, are in contact with the wall surface of the wall member 32A and the end surface of the wall member 32B, respectively. With this arrangement, the first washer 23 is substantially secured to the planetary carrier 30. As shown in the same view, the first recesses 24 of the first washer 23 are vertically aligned with the second recesses 27 of the second washer 26. When this occurs, supplying oil as a lubricant causes the oil to run along the inner walls of the first recesses 24 and the second recesses 27. Consequently, the oil is delivered to various components and, at the same time, the oil is accumulated in some of the first recesses 24 and the second recesses 27.

As shown in the views at the upper left-hand and upper right-hand corners of FIG. 13, when the pinion gear 20 is rotated clockwise, the second washer 26 is also rotated clockwise in conjunction with the rotation of the pinion gear 20. At this time, since the projection 25 is in contact with the wall members 32, the first washer 23 is not rotated despite being subjected to a rotating force from the second washer 26. Consequently, no friction is generated between the first washer 23 and the planetary carrier 30.

As shown in the views at the upper right-hand and the lower left-hand corners of FIG. 13, the second washer 26 continues to be rotated in conjunction with the rotation of the pinion gear 20. When the second washer 26 is rotated by one-quarter turn, the first recesses 24 of the first washer 23 are vertically aligned with the second recesses 27 of the second washer 26. The rotation of the pinion gear 20 is accompanied by a reduction in the amount of oil films formed among the components. However, some of the oil accumulated in the first recesses 24 of the first washer 23 and the second recesses 27 of the second washer 26 is delivered to oil films among the components in conjunction with the rotation. With this arrangement, the planetary gear mechanism 1 according to this embodiment in which the second washer 26 is rotated in conjunction with the rotation of the pinion gear 20 can successfully maintain the oil films between the washers and between the washers and the pinion gear 20. The oil films help reduce friction between the first washer 23 and the second washer 26, thereby improving the wear resistance of the washers. In addition, the oil films help maintain sliding friction between the first washer 23 and the second washer 26 at 0.1 Nm or less. Furthermore, the manganese phosphate coating provided on the surface of the second washer 26 helps improve the wear resistance of the second washer 26.

The effect by the planetary gear mechanism 1 according to this embodiment described above will be summarized below. In the planetary gear mechanism 1 of the first aspect, the washers 21 (first washers 23 and second washers 26) are provided between the pinion gears 20 and the planetary carrier 30. The first washers 23 have projections 25 projecting radially outwardly from their outer circumferential sides and are disposed on the side of the planetary carrier 30. When the pinion gears 20 are rotated, the projections 25 prevent the washers 23 from being rotated in conjunction with the rotation of the pinion gears 20. Consequently, preventing the rotation of the first washers 23 eliminates friction between the first washers 23 and the planetary carrier 30, thereby improving the wear resistance.

In the planetary gear mechanism 1 of the second aspect, the second washers 26 are coated with manganese phosphate. The manganese phosphate coating reduces friction between the first washers 23 and the second washers 26, thereby improving the wear resistance.

In the planetary gear mechanism of the third aspect, the first washers 23 are formed of copper, making it easier to form the first washers 23 in addition to the projections 25.

In the planetary gear mechanism of the fourth aspect, the projections 25 of the first washers 23 are configured to come into contact with the wall members 32 of the planetary carrier 30. With this arrangement, the first washers are substantially secured to the planetary carrier 30. For this reason, no friction is generated between the first washers 23 and the planetary carrier 30. Consequently, the effect of the first aspect can be clearly provided.

In the planetary gear mechanism of the fifth aspect, the first washers 23 have first recesses 24 that are provided on inner circumferential sides so as to extend radially outwardly, the first recesses 23 being routes through which oil can be passed, and the second washers 26 have second recesses 27 that are provided on inner circumferential sides so as to extend radially outwardly, the second recesses 27 being routes through which oil can be passed. This arrangement enables oil as a lubricant to be distributed to gaps between the first washers 23 and the second washers 26 through the recesses provided in the washers. Consequently, oil films are maintained between the first washers 23 and the second washers 26, thereby ensuring the wear resistance.

The present application is not limited to the embodiment described above. Various modifications are conceivable within the scope of the present application. Though the washers according to the present application were applied to a planetary gear mechanism having a so-called single pinion in an example of applications of the present application, the washers can also be applied to a planetary gear mechanism having a double-pinion structure. In such a case, the washers can be applied to both ends of each pinion gear of the double pinions.

What is claimed is:

1. A planetary gear mechanism comprising:
    a sun gear;
    pinion gears meshing with the sun gear;
    a planetary carrier having pinion shafts which pivotally support the pinion gears;
    a ring gear meshing with the pinion gears; and
    a set of washers provided between the planetary carrier and each of the pinion gears,
    wherein each set of washers comprise:
        a first washer disposed on a side of the planetary carrier and having a projection projecting radially outwardly from an outer circumferential side of the first washer, and
        a second washer disposed between the first washer and each pinion gear,
    wherein the projection of each first washer comes into contact with the planetary carrier to prevent rotation of the first washer with respect to the planetary carrier, wherein each of the first washers has a first recess formed at an inner circumferential side of the first washer so as to recess radially outwardly from the inner circumferential side such that the first recess allows oil to pass through the first recess, wherein each of the second washers has a second recess formed at an inner circumferential side of the second washer so as to recess radially outwardly from the inner circumferential side such that the second recess allows oil to pass through the second recess, and wherein the first recess and the second recess are configured such that, when the second washer is rotated in conjunction with rotation of corresponding one of the pinion gears, a positional relationship of the first recess and the second recess is switched between an overlapped state and a not-overlapped state, wherein the overlapped state is a state in which the first recess and the second recess are overlapped with each other, and the not-overlapped state is a state in which the first recess and the second recess are not overlapped entirely with each other.

2. The planetary gear mechanism according to claim 1, wherein the set of washers are provided at each of axial ends of the pinion gears, and wherein each second washer is coated with manganese phosphate.

3. The planetary gear mechanism according to claim 1, wherein each first washer is formed of copper.

4. The planetary gear mechanism according to claim 1, wherein each projection of the first washers comes into contact with a wall of the planetary carrier.

5. The planetary gear mechanism according to claim 1, wherein width of the first recess and width of the second recess are configured such that, when the second washer is rotated in conjunction with rotation of corresponding one of the pinion gears, the positional relationship of the first recess and the second recess is switched between the overlapped state and the not-overlapped state.

* * * * *